(12) United States Patent
Ziari et al.

(10) Patent No.: US 6,522,796 B1
(45) Date of Patent: Feb. 18, 2003

(54) DEPOLARIZING POLARIZATION MODE COMBINER

(75) Inventors: Mehrdad Ziari, Pleasanton, CA (US); Edward C. Vail, Menlo Park, CA (US)

(73) Assignee: JDS Uniphase Corporation, San Jose, CA (US)

( * ) Notice: Subject to any disclaimer, the term of this patent is extended or adjusted under 35 U.S.C. 154(b) by 70 days.

(21) Appl. No.: 09/695,713

(22) Filed: Oct. 24, 2000

(51) Int. Cl.[7] .............. G02B 6/00; H04J 14/06; H01S 3/08
(52) U.S. Cl. .............. 385/11; 385/15; 385/24; 385/27; 385/28; 385/31; 385/33; 385/36; 385/39; 359/115; 359/122; 359/129; 359/124; 359/341.3; 359/345; 372/108; 372/19; 372/106
(58) Field of Search ............ 385/11, 15, 27, 385/28, 29, 38, 39, 42, 48, 88, 31, 33, 36; 359/115, 122, 133, 134, 124, 334, 340, 341.3, 345, 349, 129; 372/108, 19, 106

(56) References Cited

U.S. PATENT DOCUMENTS

| | | | | |
|---|---|---|---|---|
| 4,968,112 A | * | 11/1990 | Lovely et al. | 359/483 |
| 5,218,652 A | * | 6/1993 | Lutz | 385/11 |
| 5,335,064 A | * | 8/1994 | Nishiura et al. | 356/460 |
| 5,444,533 A | * | 8/1995 | Nishiura et al. | 356/460 |
| 5,486,916 A | * | 1/1996 | Michal et al. | 356/483 |
| 5,539,566 A | * | 7/1996 | Terahara et al. | 359/160 |
| 5,692,082 A | * | 11/1997 | Fukushima | 385/88 |
| 5,740,288 A | * | 4/1998 | Pan | 349/196 |
| 6,178,021 B1 | * | 1/2001 | Bruyere et al. | 359/122 |
| 6,404,542 B1 | * | 6/2002 | Ziari et al. | 359/341.3 |

\* cited by examiner

*Primary Examiner*—Brian Healy
(74) *Attorney, Agent, or Firm*—Allen, Dyer, Doppelt Milbrath & Gilchrist, P.A.

(57) ABSTRACT

A pump source for a fiber Raman amplifier uses multiple lasers to generate high pump power or to generate a pump beam having a tailored spectrum for producing a desired Raman gain spectral profile. Light from two lasers, in mutually orthogonal polarization states directed to a polarization combiner that produces an output having light mixed at the two orthogonal polarization states. A depolarizer depolarizes the output. The depolarizer defines first and second orthogonal polarization modes oriented so that the light output from the polarization combiner in one polarization state excites the first and second polarization modes of the depolarizer equally and the light output from the polarization combiner in the other polarization state also excites the first and second polarization modes of the depolarizer equally.

60 Claims, 8 Drawing Sheets

DEPOLARIZING POLARIZATION MODE COMBINER

FIELD OF THE INVENTION

Generally, the present invention relates to fiber optic communication systems, and particularly to combiners for combining laser beams from different lasers, to produce a depolarized output.

BACKGROUND

In many optical systems, such as pumps in optical communication systems, fiber gyros, control channels in optical amplifiers, sensors, and inteferometers, it is desirable to have a depolarized source to reduce polarization effects. For example, optical communications systems are increasingly using fiber systems that include fiber amplifiers for amplifying the optical communications signal. In particular, Raman amplifiers are becoming increasingly used for distributed or remote amplification. These amplifiers are useful because they may be implemented in the fiber that carries the optical communications signal, and do not require the insertion of a special type of fiber, as is the case with a rare earth-doped fiber amplifier. As a result, systems may be designed where amplification occurs in the transmission link itself, allowing greater transmission distances between amplifiers, higher receiver sensitivities, and lower transmission powers.

Furthermore, the wavelength range over which a Raman amplifier manifests gain is determined by the wavelength of the pump light. Therefore, a number of pump lasers at different wavelengths may be used to provide gain over a wide wavelength range. This contrasts with the rare earth-doped fiber amplifier whose gain bandwidth is determined by the rare earth species doped in the fiber. Raman amplification is also a very low noise process, limited primarily at low powers by pump noise and quantum noise effects.

One particular concern with Raman amplification is the polarization dependence of the amplification process. The Raman gain coefficient for pump light polarized parallel to a linear signal polarization is about an order of magnitude greater than for the pump polarization being orthogonal to a linear signal polarization. Thus the gain of a Raman amplifier in the field depends on the relative polarizations of the signal and the pump, which may fluctuate randomly. This results in uncertainty in amplifier performance, leading to increased errors in signal detection or increased system margin requirements.

Therefore, there is a need for pump laser systems for fiber amplifier systems that can produce a depolarized output while also delivering the desired range of pump wavelengths, so that amplifier performance can be more predictable and reliable.

SUMMARY OF THE INVENTION

In general, the present invention is directed to apparatus and method for depolarizing the output from two or more lasers. This is particularly advantageous for producing high power, depolarized light for pumping a fiber Raman amplifier, or for producing multiple wavelength, depolarized light for pumping a fiber Raman amplifier.

In one embodiment, the invention is directed to an optical device that includes a polarization combiner having a first input for light in a first polarization state and a second input for light in a second polarization state orthogonal to the first polarization state, and having an output for light mixed at the first and second polarization states. The device also includes a first polarization maintaining (PM) fiber having an input coupled to the output of the polarization combiner and defining orthogonal fiber polarization modes. The polarization maintaining fiber input is oriented so that light output from the polarization combiner in the first polarization state excites the orthogonal fiber polarization modes substantially equally.

In another embodiment, a laser system includes a first laser generating a first polarized output and a second laser generating a second polarized output. A polarization combiner has a first input coupled to receive the first polarized output and a second input coupled to receive the second polarized output polarized orthogonally to the first polarized output. The polarization combiner has an output for light comprising the first polarized output and the second polarized output. A first polarization maintaining fiber has an input coupled to the output of the polarization combiner, and defines orthogonal fiber polarization modes. The first polarization maintaining fiber input is oriented so that light output from the polarization combiner from each laser excites the orthogonal fiber polarization modes substantially equally.

Another embodiment of the invention includes polarization combining means for combining two light beams of first and second mutually orthogonal polarizations to a mixed polarization output, and depolarization means for depolarizing light coupled to receive the mixed polarization output from the polarization combining means, light of the mixed polarization output at each of the mutually orthogonal polarizations exciting polarization modes of the depolarization means equally.

Another embodiment of the invention is directed to a method of producing a depolarized light beam. The method includes combining first and second light beams of respective first and second mutually orthogonal polarizations to produce output light, and exciting orthogonal polarization modes of a polarization maintaining (PM) fiber substantially equally with the output light from the first light beam. The method also includes exciting orthogonal polarization modes of the PM fiber substantially equally with the output light from the second light beam.

Another embodiment of the invention is directed to a depolarizing device that includes a polarization combiner having a first input for light in a first polarization state and a second input for light in a second polarization state orthogonal to the first polarization state, and having an output for light mixed at the first and second polarization states. The depolarizing device also includes a depolarizer that defines first and second orthogonal polarization modes coupled to receive light from the polarization combiner output, the first and second polarization modes each being oriented so that the light output from the polarization combiner in the first polarization state is depolarized by the depolarizer independently of the light in the second polarization state and the light output from the polarization combiner in the second polarization state is depolarized by the depolarizer independently of the light in the first polarization state.

Another embodiment of the invention is directed to a method of producing a highly depolarized light beam. The method includes combining a first light beam of a first polarization state with a second light beam of a second polarization state orthogonal to the first polarization state to produce output light having a mixed polarization of the first and second polarization states. The method also includes orienting a single stage depolarizer so that output light in each of the first and second polarization states is depolarized by the depolarizer independently of the other polarization state, and passing the output light through the single stage depolarizer so as to depolarize the output light.

Another embodiment of the invention is a laser system that includes a first laser generating a first polarized output and a second laser generating a second polarized output. The laser system also includes a polarization combiner having a first input coupled to receive the first polarized output and a second input coupled to receive the second polarized output polarized orthogonally to the first polarized output, and having an output for light comprising the first polarized output and the second polarized output. The laser system further includes a depolarizer defining first and second orthogonal polarization modes coupled to receive light from the polarization combiner output, the first and second polarization modes each being oriented so that the light output from the polarization combiner in the first polarization state is depolarized by the depolarizer independently of the light in the second polarization state and the light output from the polarization combiner in the second polarization state is depolarized by the depolarizer independently of the light in the first polarization state.

The above summary of the present invention is not intended to describe each illustrated embodiment or every implementation of the present invention. Other objects and attainments, together with a fuller understanding of the invention will become apparent and appreciated by referring to the following description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to laser systems that produce a depolarized output, and is believed to be particularly applicable to pump laser units for pumping fiber amplifiers.

One concern with fiber amplification, particularly with fiber Raman amplification is the polarization dependence of the gain. The Raman gain coefficients are about an order of magnitude different depending on the relative polarizations of the pump beam and the signal being amplified.

In practice, the polarizations of the pump and signal beams randomly change over a long length of fiber, and typically average out over a sufficiently long length. However, it is possible that the pump and signal maintain the same relative polarization for a significant length of fiber, inducing some polarization dependence to the gain. This may happen, for example, if a significant stretch of fiber has a residual birefringence and the pump and signal happen to launch into this stretch of fiber in a linear polarization state aligned to the principle axis of the birefringence. In such a case, the fiber acts as a polarization maintaining fiber, keeping the polarization of the pump and signal aligned for the length of the residual birefringence as long as its principle axis angle does not abruptly change. There are many other examples of birefringence in the fiber that cause polarization of the pump and signal to remain in alignment, for both co-propagating and counter-propagating Raman pumping configurations. The dispersion of the birefringence may eventually cause the polarization of the pump and signal wavelengths to walk off from each other.

Polarization dependent gain (PDG) may induce some uncertainty in amplifier performance, for example reducing gain, signal-to-noise ratio (SNR) and signal at the receiver, introducing errors or necessitating an increase in the required system margins. Therefore, it is desirable to have an unpolarized communications signal and/or to have unpolarized pump light, where unpolarized means not polarized or polarization scrambled. It is usually preferable to depolarize the pump light since it only must be depolarized significantly faster than the averaging time of the Raman system (~10 ns for co-propagating and ~10 $\mu$s for counter-propagating), while a source would have to be depolarized significantly faster than the bit rate (~100 ps for 10 Gb/s systems) which would broaden the source linewidth to a value greater than the broadening due to modulation. Where the light is not polarized, the instantaneous polarization is rapidly changing, in timescales on the order of 1/linewidth of the source. Where the light's polarization is scrambled, the polarization of the light is scanned over all polarization states at a slower rate than 1/linewidth of the source. As long as the polarization changes at a rate faster than the averaging time of the fiber amplifier, then the fiber Raman amplifier shows little polarization dependence. The averaging time for a fiber Raman amplifier in a co-propagating configuration is of the order of 10 ns, depending on the fiber used, while the averaging time in the counter-propagating direction the averaging time is on the order of 10 $\mu$s. One method of overcoming the problems of PDG is to depolarize the amplifier pump light using a depolarizer.

Figure 1:
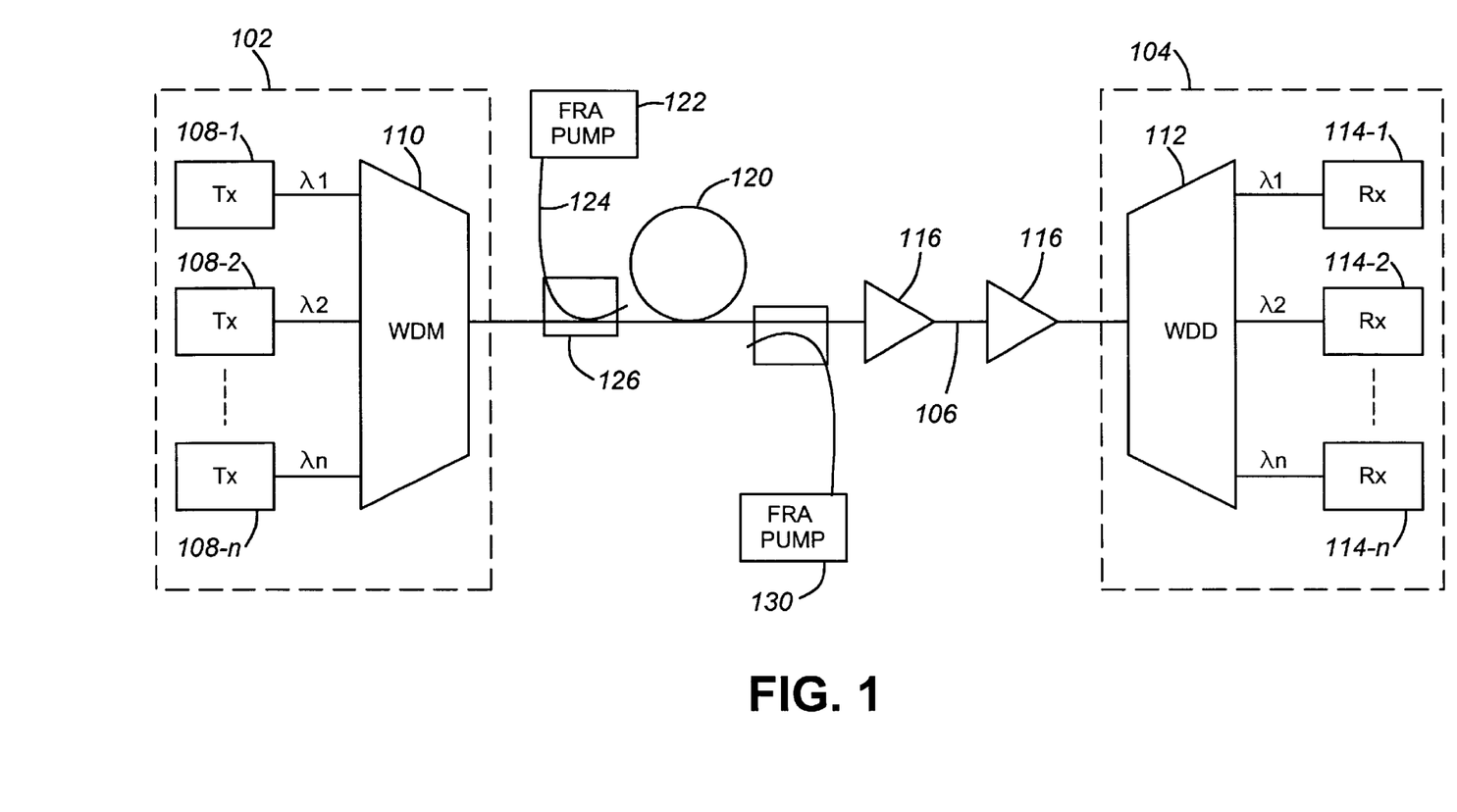
FIG. 1 schematically illustrates an embodiment of an optical fiber communications system.

FIG. 1 shows an example of a fiber-based optical communications system 100 having a transmitter unit 102 and a receiver unit 104 coupled by a fiber communications link 106. The system may be based on the use of a single wavelength, or may be based on the use of multiple wavelengths of light. A common approach to using multiple wavelengths of light is wavelength division multiplexing (WDM). Dense WDM (DWDM) systems may also be used. As used herein, "WDM" includes DWDM.

The communications system 100 may be a WDM system, and the transmitter unit 102 may include a number of semiconductor laser transmitters 108-1, 108-2, . . . 108-n operating at different wavelengths $\lambda 1, \lambda 2, \ldots, \lambda n$ respectively. The laser transmitters typically operate at a wavelength of around 1550 nm, although communications at other wavelengths are also possible. The light output from each laser transmitter 108-1, 108-2, . . . 108-n is combined in a wavelength division multiplexer 110 for transmission through the fiber link 106.

After propagating through the fiber link 106, the multiplexed optical signal is received at the receiver unit 104. The light is split into its different wavelength components λ1, λ2, . . . , λn in a wavelength division demultiplexer 112, and each wavelength component is detected by a respective receiver 114-1, 114-2, . . . , 114-n. The fiber link 106 may include multiple fibers, although only a single fiber is considered in the following description, for clarity.

Transmission losses within the fiber link 106 result in a reduction in the signal strength as the signal propagates between the transmitter 102 and the receiver 104. Optical amplifiers 116 may be positioned along the fiber so that the SNR is maintained at a sufficiently high level so that the signal, when it reaches the receiver 104, is sufficiently strong to reduce errors to an acceptable level. This can be accomplished by adding amplifiers 116 in series along communications fiber 106 until the destination is reached. The amplifiers 116 may be any type of fiber optical amplifier, including an EDFA, a FRA, or a combination of EDFA and FRA.

An FRA 120 is also shown positioned close to the output from the transmitter 102 in order to boost the communications signal as it enters the communications fiber 106 from the transmitter 102. The FRA 120 is pumped with an FRA pump 122, whose output is preferably depolarized. Where the optical communication signal has a wavelength of about 1550 nm, the FRA pump 122 is typically one or more semiconductor lasers operating at a wavelength of around 1455 nm. The actual pump wavelength depends on the wavelength to be amplified and the Stokes shift of the fiber, which is determined by the type of fiber used for the FRA. It should be noted that the FRA 120 may be formed in the transmission fiber of the link itself.

The pump light produced by the FRA pump 122 is typically coupled to the FRA 120 through a coupling fiber 124 and a fiber-fiber WDM coupler 126, although other coupling schemes may also be used. In the particular configuration illustrated, the pump light is directed along the FRA 120 in the same direction as the communication signal from the transmitter 102. This configuration is referred to as a co-propagating configuration. It will be appreciated that the FRA 120 may be also be pumped in a counter-propagating configuration, for example by FRA pump 130.

A common approach to scaling up pump power, or to providing a multi-wavelength pump beam is to polarization combine the light produced by two lasers. When the two lasers produce the same wavelength, the output is fairly well depolarized, since there is no phase relationship between the outputs of the two lasers. However, if the amplitudes of the signals from each laser are not the same, then the combined signal will tend to manifest the polarization state of the laser producing the stronger signal. Furthermore, this method fails to produce a highly depolarized output when the wavelengths of the two lasers are different. The mixing of two wavelengths is commonly used where a fiber Raman amplifier needs two pump wavelengths to meet requirements of gain and gain flatness. For example, a C-band fiber Raman amplifier typically requires two wavelengths to cover a gain bandwidth of 30 nm. Both of these problems may be overcome by depolarizing the combined output from the polarization combiner.

Figure 2:
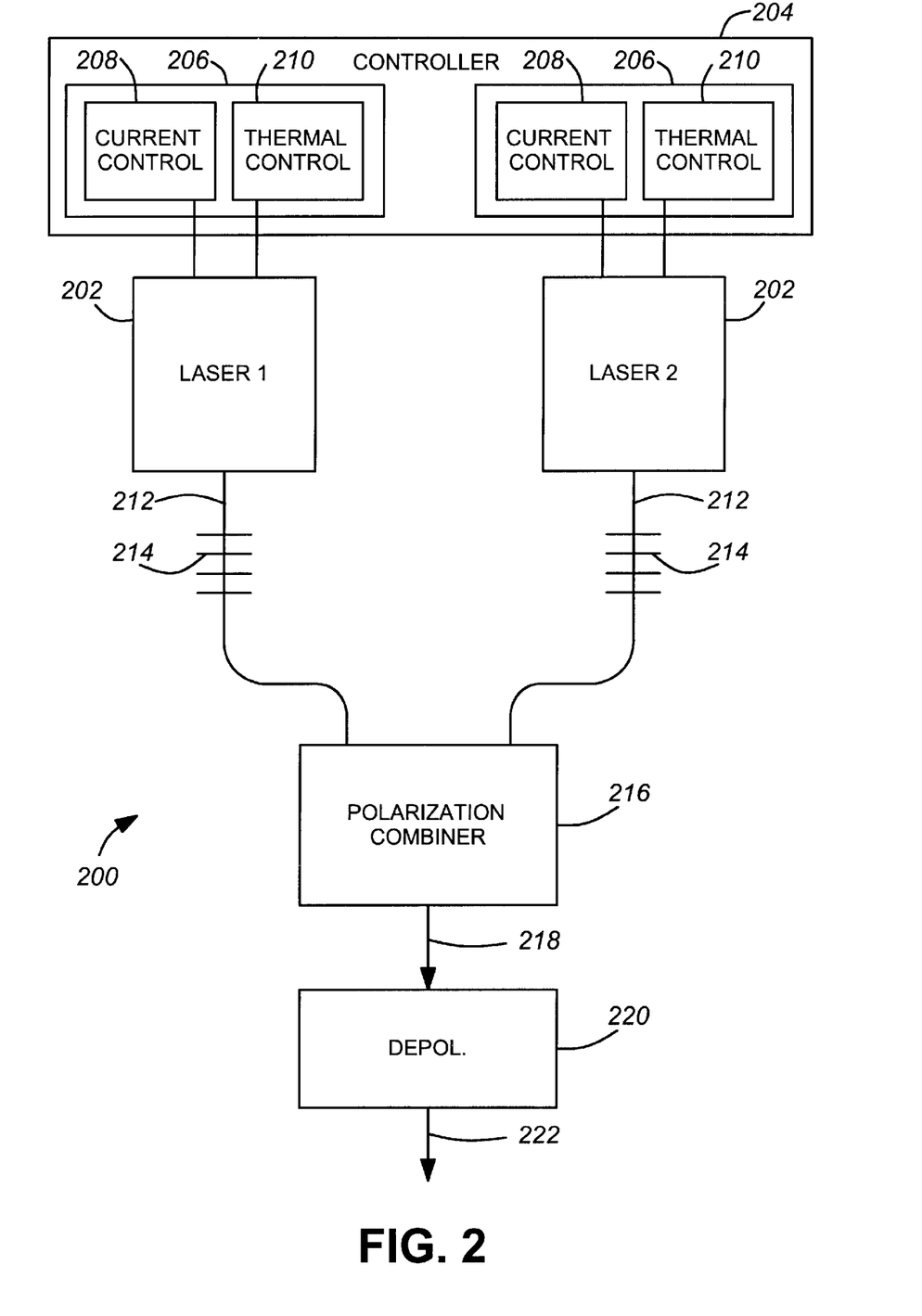
FIG. 2 schematically illustrates an embodiment of a depolarized fiber Raman amplifier pump laser unit according to the present invention.

A dual laser source 200, as may be used as a depolarized FRA pump, is schematically illustrated in FIG. 2. A common approach to the dual laser source 200 includes two or more lasers 202. The lasers 202 are typically attached to a controller 204 that includes individual control units 206 for each laser 202. Each control unit 206 may include a power supply 208 for providing and controlling current directed to the lasers 202. The control units 206 may also include a thermal controller 210 to stabilize the operating temperature of the lasers 202. For example, the lasers 202 may each include a semiconductor laser element thermally coupled to a thermoelectric cooler that is operated by the thermal controller 210, to cool the laser element to a specific operating temperature.

Furthermore, it is desirable that the spectrum and output power of the lasers 202 are stable, in order to maintain constant gain and gain spectrum. Accordingly, each laser 202 may be coupled into a fiber 212 that has a fiber Bragg grating (FBG)214. The FBG 214 reflects a portion of the output form the laser 202 back to the laser 202 and stabilizes the output wavelength on the wavelength that is maximally reflected by the FBG 214. The temperature dependence of the FBG 214 is considerably less that the temperature dependence of the band-gap of the laser 202, and so the wavelength produced by the FRA pump 200 has reduced temperature sensitivity. The FBG 212 may also encourage the laser 202 to operate in coherence collapse, so that the output has a broad time-averaged spectrum, as further described in U.S. patent application Ser. No. 09/559,936, incorporated herein by reference, now pending.

The light output by each fiber 212 is polarized, and the outputs from the fibers 212 are combined in a polarization combiner 216. The fibers 212 may be polarization maintaining (PM) fibers so as to ensure that the polarized light produced by the lasers 202 remains polarized up to the polarization combiner 216. A polarization combiner 216 is an optical element that receives as inputs light beams having orthogonal polarizations and produces an output of light mixed in the two orthogonal polarizations. The polarization combiner 216 may be a polarizing beamsplitter, a birefringent beam splitting element, or the like. The combined output 218 then passes into a depolarizer 220 that depolarizes the combined output 218 to produce a further depolarized output 222.

Figure 10:
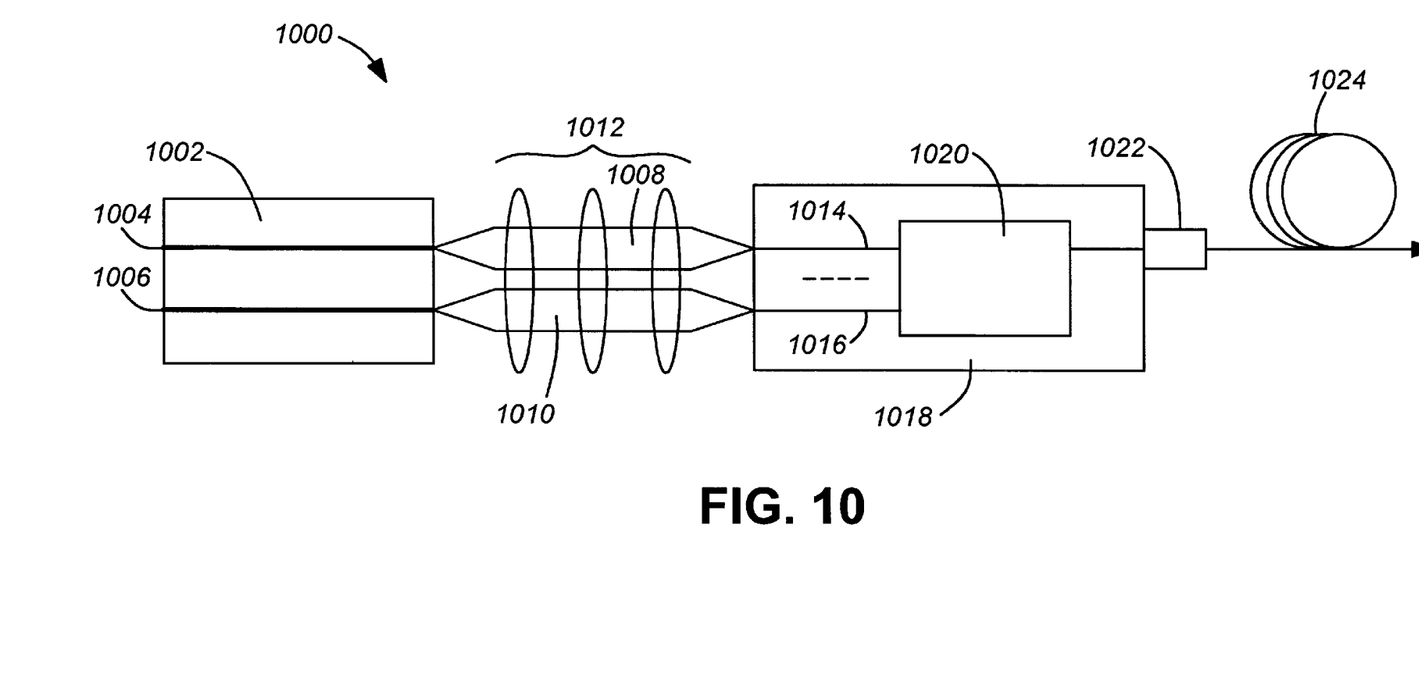
FIG. 10 illustrates an embodiment of a dual-output semiconductor source.

Another embodiment of a dual polarized laser source 1000 is schematically illustrated in FIG. 10, which shows a dual waveguide diode laser 1002 that has two emitters 1004 and 1006 on a single laser chip. The two emitters 1004 and 1006 may be stripe emitters or emitters of some other suitable geometry. The two emitters 1004 and 1006 need not generate mutually incoherent outputs 1008 and 1010. The two outputs 1008 and 1010 may be of the same wavelength, but this is not a requirement, and the two outputs may operate at different wavelengths. The two outputs 1008 and 1010 are typically polarized parallel due to the nature of stimulated emission in the laser source 1000. The dual waveguide laser 1002 is described further in U.S. patent application Ser. No. 09/613,519, filed Jul. 10, 2000, titled MULTIPLE EMITTER SEMICONDUCTOR LASER PUMP SOURCE FOR SCALING OF PUMP POWER AND GENERATION OF UNPOLARIZED LIGHT FOR LIGHT SIGNAL AMPLIFICATION, and incorporated herein by reference, now U.S. Pat. No. 6,404,542, issued Jun. 11, 2002.

The output beams 1008 and 1010 may propagate through a lens system 1012 that may include multiple lenses, for collimation, cylindrical correction and focusing. The lens system may focus output beams 1008 and 1010 into respective waveguides 1014 and 1016 on a waveguide structure 1018 for subsequent combination in combiner 1020. The combined output may then be passed through coupling optics 1022 to a fiber 1024.

In another embodiment, in lieu of the lens system 1012, the dual waveguide diode laser 1002 may be integrated with a mode expander to provide low loss, butt-joint coupling to the waveguide structure 1018. Different approaches to combining the outputs 1008 and 1010 are discussed below.

Polarization mode combining the twin outputs from such a source requires that the two output beams 1008 and 1010 be orthogonally polarized. This may be achieved, for example, by rotating the polarization of one of the beams 1008 and 1010 using a retardation plate, Faraday rotator or 90° twisted PM fiber before they are combined.

Several different approaches are available for depolarizing the light, such as Lyot depolarizers, fiber feedback depolarizers, split and delay depolarizers; as is discussed in U.S. patent application Ser. No. 09/559,936, which is incorporated herein by reference. One of the major advantages of the invention described here is that, because the output state of the polarization combiner is known (it is the combination of two mutually incoherent, linearly polarized sources), the depolarizer can be significantly simplified over the case where the input polarization is arbitrary or unknown. In the case of a Lyot depolarizer the length of PM fiber can be reduced by a factor of 3 to only a single stage. In the cases of a feedback depolarizer or a split and delay depolarizer, only a single stage is required to depolarize the output, as opposed to the multiple stages required for an arbitrary input polarization state.

It will be appreciated that the two lasers 202 may produce light at the same wavelength, if the polarization combiner 216 is being used simply to scale up power at a single wavelength. The depolarizer may be used to achieve a level of depolarization that is difficult to achieve by simply polarization combining the polarized output from two mutually incoherent sources: imprecise knowledge or control over the power of the two pump lasers may lead to unequal powers in the two orthogonal polarizations fed to the polarization mode combiner, resulting in residual polarization. This imprecise knowledge may be caused by the response of a monitor photodiode (MPD) fluctuating with temperature, current, or age. The problem may be improved through the use of taps, but polarization maintaining taps (PM) taps are difficult to manufacture, have unproven lifetimes, and are costly. Furthermore, this approach requires the use of control circuitry to compare the power level in the two polarization states of the output from the polarization mode combiner and to control the power of each laser accordingly in order to achieve equal partition of power in the two polarization states. The use of a depolarizer following the polarization mode combiner avoids the need for the polarization taps for the control circuitry, while still producing depolarized output.

Figure 3:
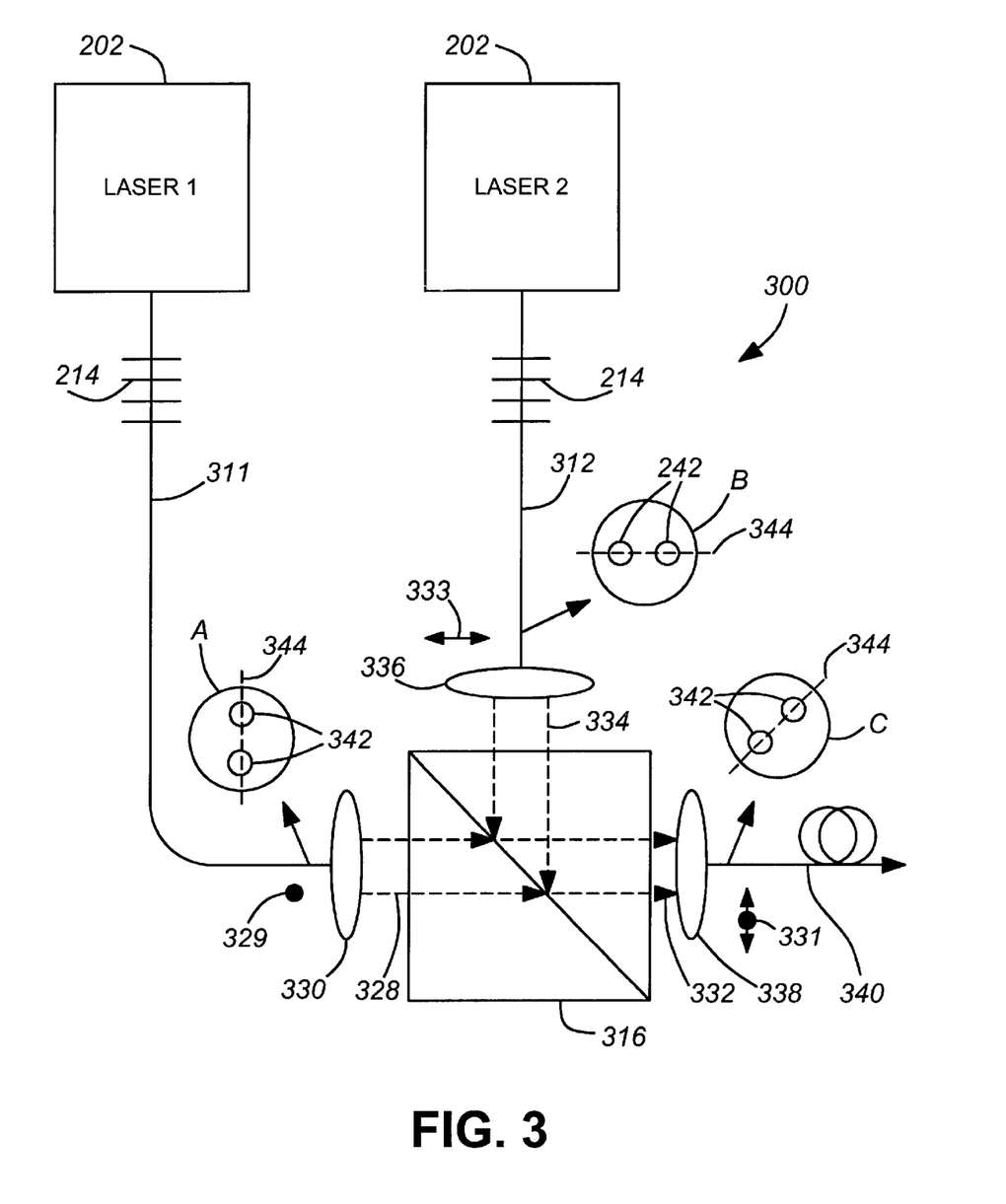
FIG. 3 schematically illustrates another embodiment of a depolarized dual laser unit according to the present invention.

Also, the two lasers may produce light at different wavelengths, for example where the output from the dual laser source 200 is tailored to produce Raman gain over a certain gain bandwidth and/or with a desired gain flatness. One of the advantages of this approach is that only one depolarizer is required to depolarize the output from two sources, rather than having one depolarizer assigned to each laser. In addition, polarization combining may be less expensive than wavelength combining since polarization combiners operate over a broad wavelength range and do not have to be made for particular wavelengths. Another embodiment of a dual-laser source 300 is illustrated in FIG. 3. This embodiment is similar to the embodiment 200 illustrated in FIG. 2, except that the output from the fibers 311 and 312 is combined in a polarizing beamsplitter 316. A polarization beamsplitter 316 transmits light having one polarization and reflects light having the orthogonal polarization. Thus, the first polarized light beam 328 from the first fiber 311, collimated by the first lens 330, is transmitted through the polarization beamsplitter 316 as output 332. The polarization of the first light beam 328 is illustrated as being into the plane of the figure by polarization indicator 329. Also, the second polarized light beam 334 from the second fiber 312 is collimated by the second lens 336 and is reflected by the polarization beamsplifter as output 332. The polarization of the second light beam 334 is illustrated as being in the plane of the figure by polarization indicator 333. Advantageously, the two light beams 328 and 334 spatially overlap in the beamsplitter so that both beams are efficiently focused by the focusing lens 338 into the output fiber 340. The mixed polarization state of the output beam 332 is illustrated as being both into the plane of the figure and in the plane of the figure by polarization indicator 331.

The cross section through the first fiber 311 is schematically illustrated as A, showing the stress zones 342 that produce birefringence in the polarization maintaining fiber 311. The polarization of light propagating within the PM fiber 311 is maintained for polarizations that are parallel or perpendicular to the bisector 344 of the stress zones 342. The directions that are parallel or perpendicular to the bisector 344 of the stress zones 342 may be considered to be polarization directions of the PM fiber. This cross section is for "Panda" fiber. It will be appreciated that other fibers with different cross sections, such as bowtie or elliptical core fibers may also be used. The stress zones are used here to indicate the orientation of the polarization modes to the polarization maintaining fiber. Fibers having a higher birefringence may be used to shorten the length of the depolarizer.

The output of the first fiber 311 is oriented so that the polarization of the first light beam 328 lies out of the plane of the figure. Likewise, the output of the second fiber 312, whose cross-section is shown as B, is oriented so that the polarization of the second light beam 334 is orthogonal to that of the first light beam 328.

The output fiber 340 may also be a PM fiber. The cross-section of the output fiber 340 is illustrated as C, showing that the polarization directions of the output fiber 340 are oriented at approximately 45° to the two mixed polarizations of the output beam 332 such that each laser equally excites the polarization modes of the PM fiber 340.

The orientation of the output fiber 340 relative to the polarization directions of the first and second beams 328 and 334 results in the output fiber depolarizing the output beam 332 received from the polarization beamsplitter, and operates in a manner similar to a Lyot depolarizer. Consider light at one polarization state entering the output fiber 340 with its polarization at 45° to the polarization direction of the fiber 340. The output fiber 340 defines orthogonal fiber polarization modes, viz. a first mode parallel to the bisector 344 and a second mode perpendicular to the bisector 344. Thus, the light entering the output fiber 340 excites the two polarization modes of the fiber 340 equally. As a result of the birefringence caused by the stress zones 342, light in the polarization mode that is parallel to the bisector 344 propagates along the fiber 340 with a velocity different from the velocity of light of the polarization mode perpendicular to the bisector 344. Once the delay between the two polarization components exceeds the coherence length of the light, the beam propagating along the fiber 340 is no longer polarized.

In this particular embodiment, the light that excites the polarization modes of the fiber 340 is a mixture of two linear polarization states. It will be appreciated, however, that the light entering the fiber need not be a mixture of linear polarization states to excite the polarization modes of the fiber 340 equally, but may be a mixture of, for example elliptically or circularly polarized states. For example, where the output from the combiner is a mixture of orthogonal elliptical polarization states, if the major axes of the polarization states are at +45° and −45° to the polarization modes of the fiber 340, then the polarization modes of the fiber 340 are equally excited by each laser.

The length of output fiber 340 selected to depolarize the light from the lasers 202 is determined in part by the coherence length of the output from the lasers 202, the birefringence of the particular PM fiber used and the degree of polarization (DoP) desired in the depolarized output, and is typically in excess of 5 m. Since the polarization beamsplifter 316 directs the first and second light beams 328 and 334 to the output fiber 340 so that their polarizations are at +45° and −45° to the bisector 344 respectively, then each beam 328 and 334 is depolarized in the fiber 340, irrespective of whether the two lasers 202 generate light at the same wavelength or at different wavelengths. Thus, the depolarizer depolarizes light in each of the beams 328 and 334 independent of the other beam.

Figure 9:
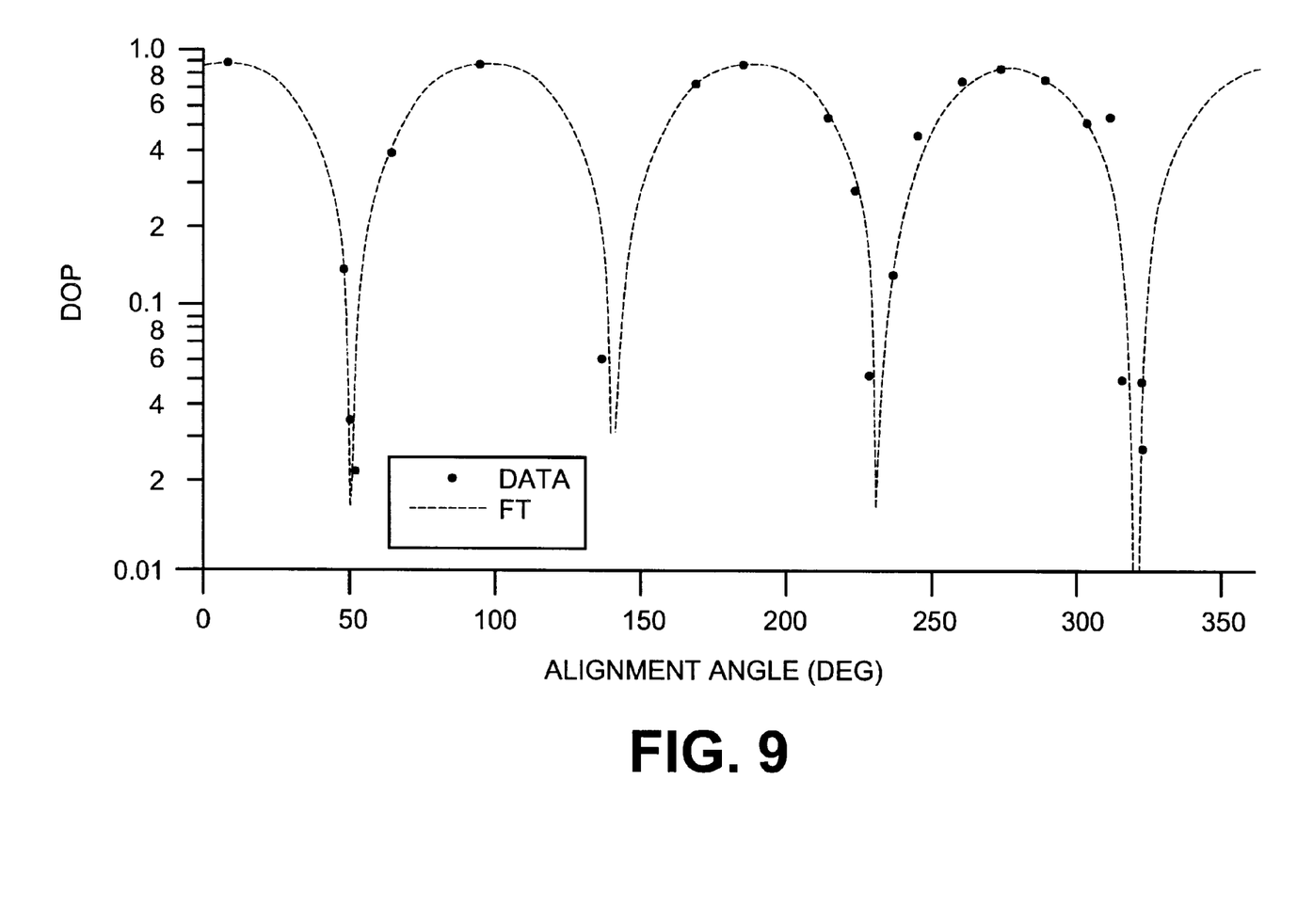
FIG. 9 illustrates a graph showing results of depolarization of light using a fiber depolarizer.

Experimental results showing the depolarization of light passing through a fiber depolarizer, such as output fiber 340, are presented in FIG. 9. The set-up used to produce these experimental results included a laser diode that coupled light into, lensed PM fiber The fiber contained a fiber Bragg grating having a 0.45 dB reflectivity at 1480 nm, with a bandwidth of 1.5 nm. The output from the fiber was spliced to a 200 m length of bow-tie PM fiber. The input end of the PM fiber mounted in a rotation stage and was rotated relative to the laser diode while the output from the 200 m length of fiber was analyzed using an HP 8509 polarization analyzer.

The graph shows the measured degree of polarization (DoP) plotted against the relative rotation angle of the rotation stage. As can be seen, the DoP fell to a minimum of a few % for every 90° of rotation, in other words the DoP reached a minimum when the polarization of the light entering the fiber was at 45° parallel to the polarization modes of the fiber. Thus, although this experiment was performed with only a single polarization of light, it will be appreciated that the fiber depolarizer will successfully depolarize light that is polarized at either +45° or −45° to the polarization modes of the fiber.

Figure 4:
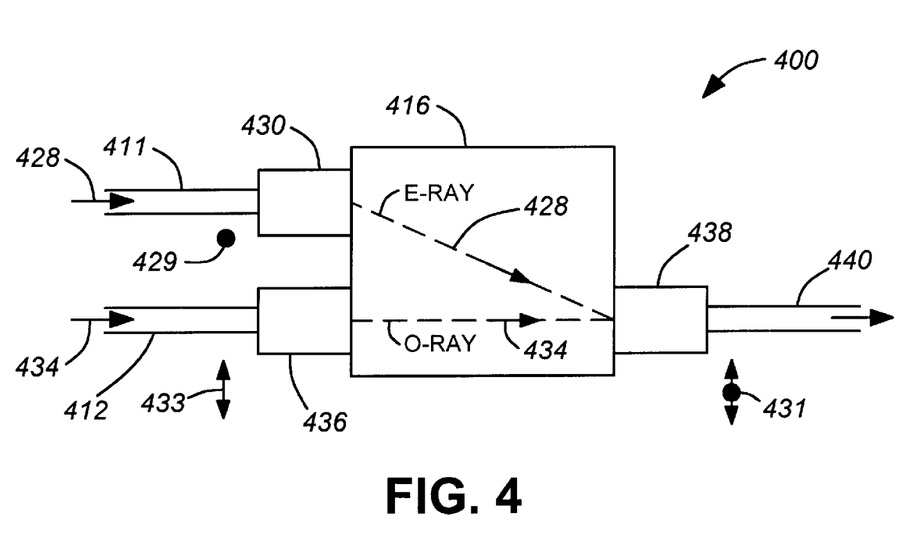
FIG. 4 schematically illustrates an embodiment of a depolarizing polarization mode combiner according to the present invention FIGS. 5–8 schematically illustrate additional embodiments of depolarizing polarization mode combiners.

Another particular embodiment of a depolarizing polarization mode combiner 400 is illustrated in FIG. 4. In this embodiment, the PM fibers 411 and 412 direct orthogonally polarized light beams 428 and 434 to a birefringent polarization beam combiner 416. The birefringent polarization beam combiner 416 is typically a birefringent crystal oriented so that an extraordinary ray propagates in a direction different from the direction of the ordinary ray. Therefore, if two beams are injected into the birefringent polarization beam combiner 416, one as an ordinary ray and the other as an extraordinary ray, then they can combine at the output. A commonly used material for a birefringent polarization beam combiner 416 is yttrium ortho-vanadate, which manifests a high birefringence.

The first light beam 428 from the first fiber 411, having a polarization in the plane of the figure, as illustrated by polarization indicator 429, is collimated in a first lens 430, which may be a gradient index (GRIN) lens and enters the birefringent polarization beam combiner 416 as an extraordinary ray. The second light beam 434 from the second fiber 412, having a polarization out of the plane of the figure, as illustrated by polarization indicator 433, is collimated in a second lens 436, which may also be a gradient index (GRIN) lens. The second light beam 434 enters the birefringent polarization beam combiner 416 as an ordinary ray.

The two beams 428 and 434 overlap at the output of the birefringent polarization beam combiner 416 where they are focused by a focusing lens 438 into the output PM fiber 440. The output PM fiber 440 is advantageously oriented with its polarization direction at about 450° relative to the polarizations of beams 428 and 434. Thus the output fiber 440 may depolarize the light output from the birefringent polarization beam combiner 416.

Figure 5:
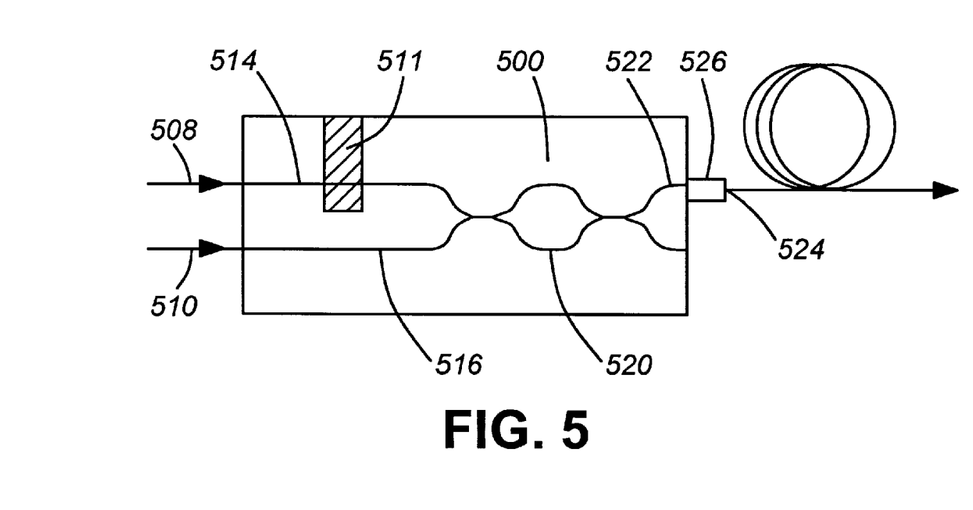

Another embodiment of polarization mode combiner is schematically illustrated in FIG. 5 which shows a waveguide coupler 500. The waveguide coupler 500 may be constructed from glass, polymer, semiconductor, crystalline or other suitable material. The waveguides 514 and 516 are advantageously polarization maintaining waveguides that preserve the polarization of light passing therethrough. Light is introduced to the waveguide coupler from two laser sources (not shown), which may be independent of each other, or may be formed on a single chip. The light from the two input beams 508 and 510 may be launched into the two waveguides with orthogonal polarizations or a polarization rotator 511, such as a half-wave retardation plate, a twisted piece of PM waveguide, or a Faraday rotator, may be placed in one waveguide 514 to rotate the polarization of one beam 508 by 90° relative to the polarization of the other beam 510. The two waveguides 514 and 516 may be formed into a conventional waveguide coupler, for example a Mach-Zehnder coupler shown schematically as 520 or a multimode interference coupler. The Mach-Zehnder coupler 520 combines the light in two beams of equal power so that substantially all optical power exits in the output waveguide 522. The light may be coupled from the output waveguide 522 into a 45° oriented PM fiber 524 by coupling optics 526 to depolarize the light.

Figure 6:
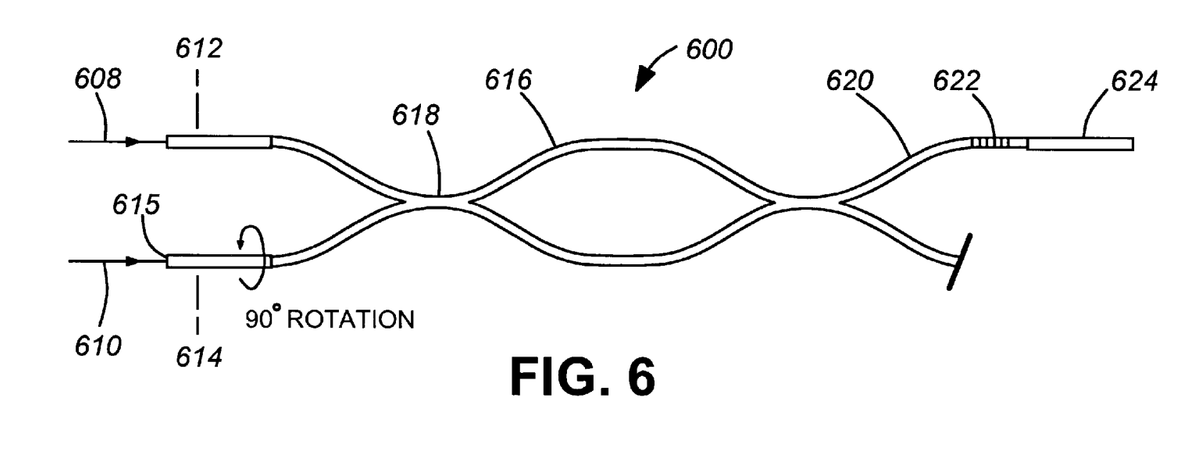

Another embodiment of waveguide coupler 600, that uses fiber waveguides is illustrated schematically in FIG. 6. Two light beams 608 and 610 from two lasers (not shown) are applied to respective PM fibers 612 and 614.

The two PM fibers 612 and 614 are fused together at selected locations to form a fiber Mach-Zehnder coupler 616. If the two beams 608 and 610 have parallel polarization, the polarization direction of one of the PM fibers 614 may be rotated by about 90° between the input 615 and the first splice 618, so that the light from the two beams 608 and 610 enters the Mach-Zehnder coupler 616 with orthogonal polarizations.

The light output from the Mach-Zehnder coupler 616 passes along output fiber 620. The output fiber 620 may be provided with a FBG 622 to stabilize the wavelength of the output beams 608 and 610. The output fiber may include a depolarizer PM fiber 624 spliced at 45° to the output fiber 620. It will be appreciated that, where the light in the beams 608 and 610 is at different wavelengths, there may be respective FBGs in the fibers 612 and 614, rather than a single FBG 622 shared by both emitters 604 and 606.

One of the advantages of this embodiment is that the light produced from the output fiber 620 typically has a low degree of polarization and that manufacturing costs should be similar to that of a standard pump laser used for fiber amplification. On the other hand, the birefringence of the PM fibers 612 and 614 must be maintained when constructing such a Mach-Zehnder coupler 616. However, with careful manufacturing during fiber fusing of the coupler regions, the birefringence can be substantially maintained.

The Mach-Zehnder coupler 616 may be unbalanced, in which case the phase difference between the light propagating in the different arms of the structure provides a narrower bandwidth of output wavelengths. Thus, unbalanced operation may be employed advantageously to provide a desired output bandwidth, although it is generally desired that the Mach-Zehnder legs be balanced to provide maximum output through the output fiber 616. Furthermore, a broad bandwidth is typically desired if the output light is being used for pumping a fiber Raman amplifier.

While the embodiments of depolarizing polarization mode combiner discussed so far have included a fiber depolarizer, this need not be the case, and other types of depolarizer may be used, for example as discussed in U.S. patent application Ser. No. 09/559,936.

Figure 7:
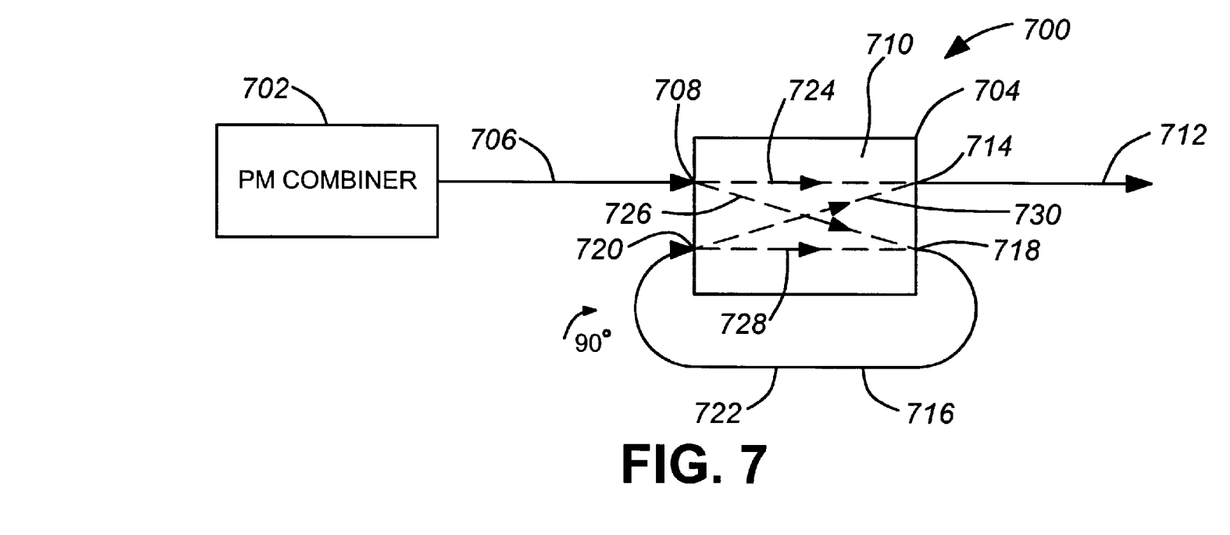

Another embodiment of a depolarizing polarization mode combiner 700 is illustrated in FIG. 7. The output from a polarization mode combiner 702 is coupled to a feedback depolarizer 704, which is discussed in greater detail in U.S. patent application Ser. No. 09/559,936. The output 706 from the polarization mode combiner 702, which may be a PM fiber is coupled to a first input 708 of a polarization-preserving 2×2 coupler 710 such that each polarization from the polarization combined light is launched into either the slow or fast axis of the fiber. An output fiber 712 is coupled to the first output 714 of the 2×2 coupler 710. A feedback path 716 is coupled between the second output 718 and the second input 720 of the 2×2 coupler 710. The polarization of the light entering the second input 720 is rotated by 90° relative to the polarization of the light exiting through the second output 718. The feedback path 716 may be a fiber, or some other type of waveguiding element. In this particular embodiment, the feedback path 716 is a PM fiber 722. The feedback fiber 722 is given a 90° twist between its ends in order to achieve the 90° polarization rotation between the second output 718 and second input 720.

Light from the polarization mode combiner 702 enters the 2×2 coupler 704 through the first input 708 and is split into two components. The first component 724 is directed to the first output 714. The second component 726 is directed to the second output 718. The light that exits the 2×2 coupler 704 through the second output 718 is fed back along the feedback path 716 into the coupler 704 at the second input 720. The polarization of the light entering the 2×2 coupler 704 through the second input 720 is rotated 90° relative to the polarization of the light entering the 2×2 coupler 704 through the first input 708.

The light entering the 2×2 coupler 704 through the second input 720 is also split into two components. The first component 728 is directed to the second output 718. The second component 730 is directed to the first output 714. Thus, the light exiting the coupler 704 through the first output 714 is a mixture of components 724 and 730 having orthogonal polarizations. Furthermore, where the optical path length of the feedback path 716 is longer than the coherence length of the light entering the coupler 704 from the laser polarization mode combiner 702, then the light in component 724 is not coherent with the light in component 730. Therefore, the degree of polarization (DoP) of the light entering the output fiber 712 is less than the DoP of light entering the coupler 704. This type of depolarizer is referred to as a feedback polarizer.

The amount by which the DoP of the light is reduced depends on several factors, including the polarization direction and DoP of the light entering the coupler 704, the length of the feedback path 716, and the splitting ratio of light from one input to the outputs, and the degree to which the optical components are polarization-preserving. Where the light from the laser polarization mode combiner 702 is a mixture of two orthogonal polarizations that are aligned to the polarization modes of the PM fiber 722, and the feedback path length is significantly long, then the DoP of the light output from the coupler 704 may be very low. Furthermore, when the polarizations of light entering the feedback depolarizer 704 are aligned to the polarization directions of the feedback path 716, then the light in each polarization state is depolarized by the depolarizer 704 independently of the light in the other polarization state.

Under ideal conditions, and ignoring losses within the depolarizer, the DoP of the light output from the coupler 704 may be substantially reduced to zero where the splitting ratio in the coupler 704 is about 1:2. The splitting ratio is defined as the fraction of light directed from one input to its associated output compared to the fraction of light directed to the other output. Thus, a splitting ratio of 1:2 corresponds to ⅓ of the light entering the first input 708 being directed to the first output 714, and ⅔ of the light being directed to the second output 718. A feedback polarizer having a splitting ratio of 70:30 has been shown to reduce the DoP of a highly polarized source to a value in the range 6%–9%, close to the theoretically predicted behavior for a feedback depolarizer exhibiting loss.

Where the polarization of the light input to the feedback depolarizer is known, as is the case with light received from a polarization mode combiner, the orientation of the polarization modes of the feedback path 716 may be selected so that depolarization is achieved with only a single stage. However, where the polarization of the light entering the feedback depolarizer is not known, then a two-stage feedback depolarizer is required to guarantee a high degree of depolarization, where the polarization modes of the first stage are at 45° relative to the polarization modes of the second stage.

Figure 8:
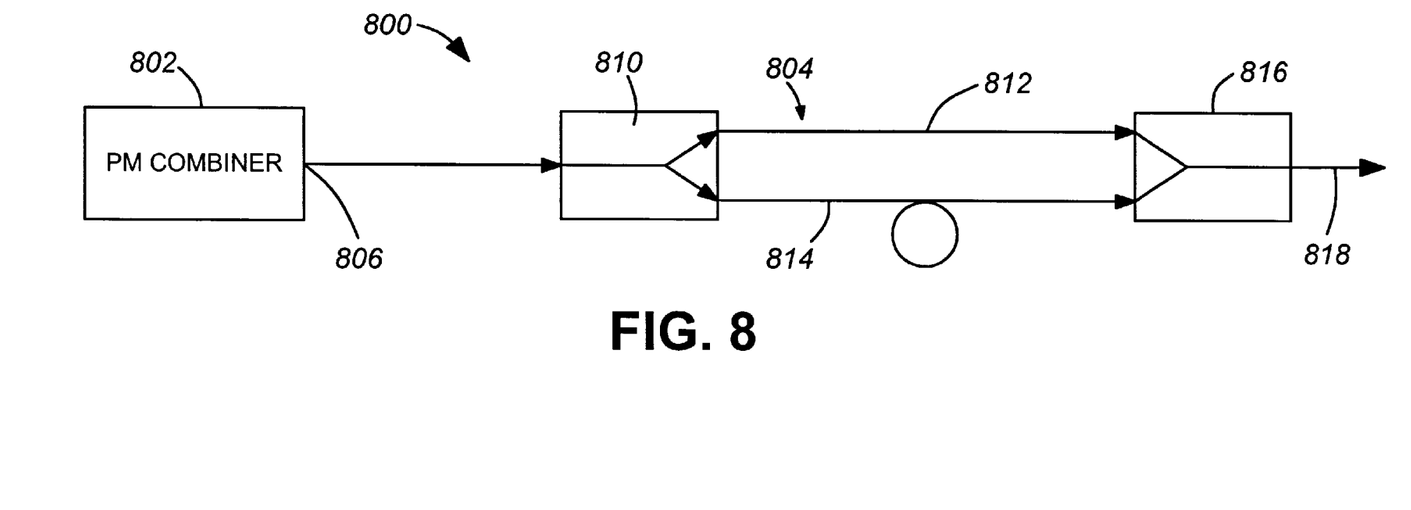

Another embodiment of a depolarizing polarization mode combiner 800 is illustrated in FIG. 8. The output from a polarization mode combiner 802 is coupled to a split-and-delay depolarizer 804, also known as a dual-arm depolarizer, which is discussed in greater detail in U.S. patent application Ser. No. 09/559,936.

The dual-arm depolarizer 804 includes a PM splitter 810, a PM combiner 816, both of which may be polarizing beamsplitters, birefringent splitters/combiners or the like, and two fibers 812 and 814 coupled between the splitter 810 and the combiner 816. Light from the output 806 of the polarization mode combiner 802 is split in the PM splitter 810 into two outputs of orthogonal polarization. Light having the first polarization propagates along the first fiber 812 and light in the second polarization propagates along a second fiber 814. To achieve a high degree of depolarization, the light is launched at about 45° to the polarization modes of the PM splitter 810. Both fibers 812 and 814 are PM fibers and preserve the polarization of the light propagating therethrough. The difference in path length between the first and second fibers 812 and 814 is preferably greater than the coherence length of the light output from the polarization mode combiner 802. The light from the two fibers 812 and 814 is combined in the PM combiner 816. The light from the combiner 816 passes into the output fiber 818. The delay of one polarization relative to the other results in the DoP of the output light being less than the DoP of the light entering the dual-arm depolarizer 804.

A dual-arm depolarizer has been tested with light of a single polarization. The light source was a semiconductor laser, grating stabilized and operating in the coherence collapsed mode, emitting polarized light at 1480 nm. The fiber 806 was a length of SMF-28, non-PM fiber. The two fibers 812 and 814 were formed from lengths of PANDA PM fiber. The second fiber 814 was 5–10 m longer than the first fiber 812, representing a path length difference longer than the coherence length of the light source. The splitter 810 and combiner 816 were polarizing beamsplitters. The DoP of light was measured using a Hewlett Packard HP8509 lightwave polarization analyzer. The DoP for light entering the depolarizer was 99.3% and the DoP measured at the output fiber 818 was 1.9%. Thus, the dual-arm depolarizer is effective at reducing the DoP of light emitted by a polarized source.

Like the feedback depolarizer, where the polarization of the light input to the dual-arm depolarizer 804 is known, the polarization of the light entering the depolarizer 804 may be selected to excite the polarization modes of the splitter 810 equally, and so a high degree of depolarization may be achieved with only a single stage. However, where the polarization of the light entering the dual-arm depolarizer 804 is not known, then a two-stage dual-arm depolarizer may be required to guarantee a high degree of depolarization, where the polarization modes of the first stage are at 450° relative to the polarization modes of the second stage.

When used in combination with a polarization mode combiner 802, the polarization of light entering the dual-arm depolarizer 804 is known, and is typically a mixture of two linear and orthogonal polarization states. Where these linear states are at ±45° to the polarization modes of the PM splitter 810, then the dual-arm depolarizer effectively depolarizes the light, irrespective of whether the output 806 from the polarization mode combiner 802 contains a single wavelength or two wavelengths. In this orientation, the light in each of the polarization states produced by the combiner is depolarized by the depolarizer independently of the light in the other polarization state.

It will be appreciated the present invention is not restricted to use as a pump for FRAs, but may be used for producing a depolarized output from two lasers for any purpose. For example, depolarized lasers may be useful in other applications, in addition to fiber amplifier pumping, such as operation of a dummy channel in a WDM multiple-wavelength communications system, as proposed in "Laser Source With Controlled Spectral Linewidth to Suppress Stimulated Brillouin Scattering (SBS) and Applications Therefor," U.S. patent application Ser. No. 09/501,712, now pending, commonly owned with the present application and incorporated by reference herein. The dummy channel may be used for maintaining a substantially constant communications signal level, even in the presence of channel drop or addition, thus maintaining uniform amplifier performance.

While various examples were provided above, the present invention is not limited to the specifics of the examples. For example, where the lasers are grating stabilized, the gratings may be at any suitable point in the system. Furthermore, it will be appreciated that, although the depolarizing polarization combiner of the present invention is useful for combining two laser beams for pumping a fiber Raman amplifier, its use is not restricted to this application and may be used wherever polarized light beams are to be combined and a depolarized output is desired.

As noted above, the present invention is applicable to producing a depolarized laser output. While having use in many different applications, it is believed to be particularly useful in depolarizing the combined output from semiconductor lasers for pumping a Raman-based fiber amplifier. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A depolarizing combiner device comprising:
   a polarization combiner having a first input to which a first light beam having a first polarization is applied, a second input to which a second light beam having a second polarization, orthogonal to said first polarization, is applied, said polarization combiner being operative to produce at an output thereof a mixed polarization light beam having said first and second polarizations; and
   a first polarization maintaining (PM) optical fiber that maintains therein mutually orthogonal modes of light polarization, and having an input coupled to said output of said polarization combiner so that said mixed polarization light beam produced by said polarization combiner is coupled into and propagates through said first PM optical fiber, and wherein said first PM optical fiber is oriented with respect to said first and second polarizations of said mixed polarization light beam coupled thereto from said output of said polarization combiner, so as to cause said mixed polarization light beam to be depolarized into said mutually orthogonal modes equally within said first PM optical fiber.

2. A device as recited in claim 1, wherein the first and second polarizations, are linear polarizations.

3. A device as recited in claim 2, wherein the orthogonal fiber polarization modes are at 45° to the first and second polarizations.

4. A device as recited in claim 1, wherein the polarization combiner is a polarizing beamsplitter.

5. A device as recited in claim 1, wherein the polarization combiner is a birefringent polarization combining element.

6. A device as recited in claim 1, wherein the polarization combiner is a waveguide polarization combiner.

7. A device as recited in claim 6, wherein the polarization combiner is a Mach-Zehnder coupler.

8. A device as recited in claim 7, wherein the Mach-Zehnder coupler includes two PM fibers having two fusion regions where the two PM fibers are fused together.

9. A device as recited in claim 1, wherein the polarization combiner comprises a coupler formed in a waveguide on a substrate.

10. A device as recited in claim 9, wherein the coupler is a Mach-Zehnder coupler.

11. A device as recited in claim 9, wherein the coupler is a multimode interference coupler.

12. A device as recited in claim 1, further comprising a first focusing element disposed between the polarization combiner and the first polarization maintaining fiber to focus light output from the polarization combiner to the first polarization maintaining fiber.

13. A device as recited in claim 1, further comprising a second polarization maintaining (PM) fiber coupled via a first collimating element to the polarization combiner to input the first light beam having the first polarization and a third polarization maintaining (PM) fiber coupled via a second collimating element to the polarization combiner to input the second light beam having the second polarization.

14. A device as recited in claim 13, wherein the first and second collimating elements include graded index lenses.

15. A device as recited in claim 1, wherein the first polarization maintaining fiber has a length greater than 3 m.

16. A laser system comprising:
   a first laser generating a first polarized light beam;
   a second laser generating a second polarized light beam;
   a polarization combiner having a first input to which said first polarized light beam is applied at a first polarization, a second input to which said second polarized beam is applied at a second polarization, orthogonal to said first polarization, said polarization combiner being operative to produce at an output thereof a mixed polarization light beam having said first and second polarizations; and
   a first polarization maintaining (PM) optical fiber that maintains therein mutually orthogonal modes of light polarization, and having an input coupled to said output of said polarization combiner so that said mixed polarization light beam produced by said polarization combiner is coupled into and propagates through said first PM optical fiber, and wherein said first PM optical fiber is oriented with respect to said first and second polarizations of said mixed polarization light beam coupled thereto from said output of said polarization combiner, so as to cause said mixed polarization light beam to be depolarized into said mutually orthogonal modes equally within said first PM optical fiber.

17. A laser system as recited in claim 16, further comprising a first control unit coupled to the first laser to supply a drive current to the first laser and a second control unit coupled to the second laser to supply a drive current to the second laser.

18. A laser system as recited in claim 17, wherein the first control unit further includes a cooler thermally coupled to the first laser to control a temperature of the first laser and the second control unit includes a second cooler thermally coupled to the second laser to control a temperature of the second laser.

19. A laser system as recited in claim 16, wherein the first polarized light beam is at a first wavelength and the second polarized light beam is at a second wavelength different from the first wavelength.

20. A laser system as recited in claim 16, wherein the first and second polarized light beams have the same wavelength.

21. A laser system as recited in claim 16, wherein the first laser is coupled to the first input of the polarization combiner via a second polarization maintaining fiber and the second laser is coupled to the second input of the polarization combiner via a third polarization maintaining fiber.

22. A laser system as recited in claim 21, wherein the second polarization maintaining fiber includes a fiber Bragg grating for reflecting light at a first wavelength so as to stabilize the first polarized light beam at the first wavelength.

23. A laser system as recited in claim 21, wherein the third polarization maintaining fiber includes a fiber Bragg grating for reflecting light at a second wavelength so as to stabilize the second polarized light beam at the second wavelength.

24. A laser system as recited in claim 23, wherein the first laser and second lasers operate under coherence collapse.

25. A laser system as recited in claim 16, further comprising a fiber amplifier coupled to an output of the first polarization maintaining fiber.

26. A laser system as recited in claim 25, further comprising a wavelength division multiplexed (WDM) transmitter coupled via a first communications fiber to an input of the fiber amplifier and a WDM receiver coupled via a second communications fiber to an output of the fiber amplifier.

27. A laser system as recited in claim 16, further comprising a WDM transmitter, wherein the first and second lasers comprise laser sources of the WDM transmitter, and an output of the first polarization maintaining fiber is coupled to an output from the WDM transmitter.

28. A laser system as recited in claim 16, wherein the first laser includes a first emitter on a laser chip and the second laser includes a second emitter on the laser chip, and further including a polarization rotator disposed between the second emitter and the polarization combiner.

29. A method for producing a depolarized light beam comprising the steps of:
   (a) combining a first light beam having a first polarization with a second light beam having a second polarization, orthogonal to said first polarization, to produce mixed polarization light beam having said first and second polarizations;
   (b) providing a first polarization maintaining (PM) optical fiber that maintains therein mutually orthogonal modes of light polarization; and
   (c) optically coupling said mixed polarization light beam produced by said polarization combiner in step (a) into said first PM optical fiber at a prescribed optical orientation that causes said mixed polarization light to be introduced into and propagate through said first PM optical fiber as a depolarized light beam having said mutually orthogonal modes equally within said first PM optical fiber.

30. A method as recited in claim 29, wherein the first and second light beams are of different wavelengths.

31. A method as recited in claim 29, wherein the first and second light beams are of a similar wavelength.

32. A method as recited in claim 29, further comprising pumping a fiber amplifier with depolarized light from the PM fiber and amplifying an optical signal in the fiber amplifier.

33. A depolarizing device, comprising:
   a polarization combiner having a first input for light in a first polarization state and a second input for light in a second polarization state orthogonal to the first polarization state, and having an output for light mixed at the first and second polarization states; and
   a depolarizer defining first and second orthogonal polarization modes coupled to receive light from the polarization combiner output, the first and second polarization modes each being oriented so that the light output from the polarization combiner in the first polarization state is depolarized by the depolarizer independently of the light in the second polarization state and the light output from the polarization combiner in the second polarization state is depolarized by the depolarizer independently of the light in the first polarization state.

34. A device as recited in claim 33, wherein the depolarizer is a single stage depolarizer.

35. A device as recited in claim 33, wherein the depolarizer is a dual-arm depolarizer having light in the first polarization mode propagating in a first arm and light in the second polarization mode propagating in a second arm.

36. A device as recited in claim 33, wherein the depolarizer is a feedback depolarizer.

37. A device as recited in claim 33, wherein the depolarizer is a single stage Lyot depolarizer.

38. A device as recited in claim 33, wherein the depolarizer is a polarization maintaining fiber.

39. A device as recited in claim 33, wherein the polarization combiner is a polarizing beamsplitter.

40. A device as recited in claim 33, wherein the polarization combiner is a birefringent polarization combining element.

41. A device as recited in claim 33, wherein the polarization combiner is a waveguide coupler.

42. A device as recited in claim 41, wherein the waveguide coupler is a fiber coupler.

43. A device as recited in claim 41, wherein the waveguide coupler includes a planar waveguide coupler formed on a substrate.

44. A device as recited in claim 43, wherein the waveguide coupler is a multimode interference coupler.

45. A device as recited in claim 41, wherein the waveguide coupler is a Mach-Zehnder coupler.

46. A method of producing a highly depolarized light beam, comprising:

combining a first light beam of a first polarization state with a second light beam of a second polarization state orthogonal to the first polarization state to produce output light having a mixed polarization of the first and second polarization states;

orienting a single stage depolarizer so that output light in each of the first and second polarization states is depolarized by the depolarizer independently of the other polarization state; and passing the output light through the single stage depolarizer so as to depolarize the output light.

47. A method as recited in claim 46, wherein the first and second light beams are of different wavelengths.

48. A method as recited in claim 46, wherein the first and second light beams are of a similar wavelength.

49. A method as recited in claim 46, further comprising pumping a fiber amplifier with the depolarized output light and amplifying an optical signal in the fiber amplifier.

50. A laser system, comprising:

a first laser generating a first polarized output;

a second laser generating a second polarized output;

a polarization combiner having a first input coupled to receive the first polarized output and a second input coupled to receive the second polarized output polarized orthogonally to the first polarized output, and having an output for light comprising the first polarized output and the second polarized output; and a depolarizer defining first and second orthogonal polarization modes coupled to receive light from the polarization combiner output, the first and second polarization modes each being oriented so that the light output from the polarization combiner in the first polarization state is depolarized by the depolarizer independently of the light in the second polarization state and the light output from the polarization combiner in the second polarization state is depolarized by the depolarizer independently of the light in the first polarization state.

51. A laser system as recited in claim 50, further comprising a first control unit coupled to the first laser to supply a drive current to the first laser and a second control unit coupled to the second laser to supply a drive current to the second laser.

52. A laser system as recited in claim 50, wherein the first polarized output is at a first wavelength and the second polarized output is at a second wavelength different from the first wavelength.

53. A laser system as recited in claim 50, wherein the first and second polarized outputs are both at a same wavelength.

54. A laser system as recited in claim 50, wherein the first laser includes a first emitter on a laser chip and the second laser includes a second emitter on the laser chip, and further including a polarization rotator disposed between the second emitter and the polarization combiner.

55. A laser system as recited in claim 50, wherein the first laser is coupled to the first input of the polarization combiner via a second polarization maintaining fiber and the second laser is coupled to the second input of the polarization combiner via a third polarization maintaining fiber.

56. A laser system as recited in claim 55, wherein the second polarization maintaining fiber includes a fiber Bragg grating for reflecting light at a first wavelength so as to stabilize the first polarized output at the first wavelength.

57. A laser system as recited in claim 55, wherein the third polarization maintaining fiber includes a fiber Bragg grating for reflecting light at a second wavelength so as to stabilize the second polarized output at the second wavelength.

58. A laser system as recited in claim 50, wherein the first laser and second lasers operate under coherence collapse.

59. A laser system as recited in claim 50, further comprising a fiber amplifier coupled to an output of the first polarization maintaining fiber.

60. A laser system as recited in claim 59, further comprising a wavelength division multiplexed (WDM) transmitter coupled via a first communications fiber to an input of the fiber amplifier and a WDM receiver coupled via a second communications fiber to an output of the fiber amplifier.

* * * * *